UNITED STATES PATENT OFFICE.

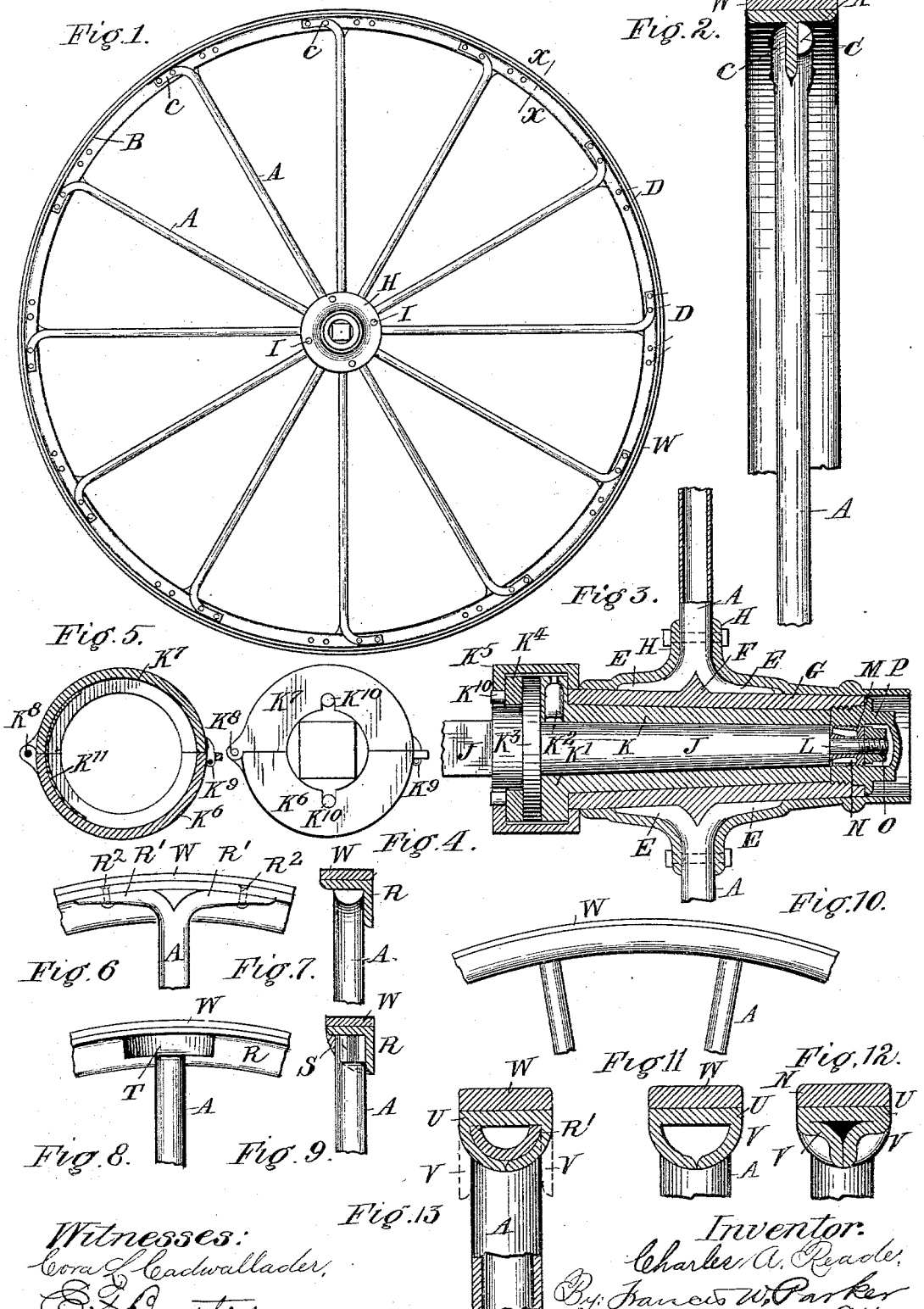

CHARLES A. READE, OF CHICAGO, ILLINOIS.

VEHICLE-WHEEL.

SPECIFICATION forming part of Letters Patent No. 381,722, dated April 24, 1888.

Application filed July 29, 1887. Serial No. 245,599. (No model.)

*To all whom it may concern:*

Be it known that I, CHARLES A. READE, a citizen of the United States, and a resident of Chicago, in the county of Cook and State of Illinois, have invented a new and useful Vehicle-Wheel, of which the following is a specification.

My invention relates to wheels for vehicles and devices for securing them on the axle, as illustrated in the accompanying drawings, wherein—

Figure 1 is a side view of one of my improved wheels. Fig. 2 is a detail part-sectional view of one spoke. Fig. 3 is a part-sectional view of the hub, axle, and wheel, showing the manner in which it is secured. Figs. 4 and 5 are detailed portions thereof. Figs. 6, 7, 8, and 9 are detail views of my improvement as modified to apply it to angle-iron. Figs. 10, 11, 12, and 13 are detail views of its application to channel-iron.

Like parts are indicated by the same letter in all the figures.

A A are spokes, preferably tubular, as shown in some of the drawings.

B is a continuous strip of T-iron.

C C are the ends of the spoke, the same being bifurcated at its outer end to straddle the lip on the T-iron, as shown in Fig. 2. These ends are secured by bolts D D to the T-iron, as shown in Fig. 1. At the opposite end each spoke is bifurcated into the two end portions, E E, which straddle the angular ridge F on the sleeve G, as shown in Fig. 3. To hold these ends in position on the sleeve, they are held on by the plates H H, which plates may be shrunk onto the sleeve G and over the ends E E, or may be held by the bolts I I.

J is the axle; K, a sleeve thereon, having the flange K' at one end, with the oil-receptacle K$^2$ therein.

K$^3$ is a flange on the axle; K$^4$, an annular collar thereon; K$^6$, a box which incloses the flanges K' and K$^3$ and the collar K$^4$, as shown, thus holding the sleeve K onto the axle. This box is composed of two portions, K$^5$ and K$^7$, hinged together at K$^8$ and locked at K$^9$, and provided with slots at each side to engage the pins K$^{10}$ K$^{10}$, which are formed on the axle and which cause the box to rotate with the axle. K$^{11}$ is a spring inside of this box, which is secured to its parts by bolts, and has a tendency when the box is opened to close it.

L is a screw-rod projecting from the end of the axle; M, a washer thereon, having the annular passage N, which opens against the end of the axle. This washer rests on the projecting pin L, and is held in position by the nut O. The cap P is then screwed in position, being held by screw-threads both to the sleeve G and the washer M, as shown.

R is a piece of angle-iron to which the spokes are secured, their bifurcated ends R' R' being secured directly in the side of the angle-iron by the pins R$^2$ R$^2$, as shown.

S is a piece of metal which can be welded in across the angle-iron to finish the work when the spokes have been secured in position.

T is a welded joint whereby the spoke A is secured to the angle-iron R.

U is a piece of channel-iron the sides of which, V V, inclose the bifurcated ends K' of the spoke A, and they may be then driven together about such spokes, as shown in Figs. 11, 12, and 13, to make a complete joint.

W is a tire secured to the angle iron or T or channel iron, as the case may be.

The use and operation of my invention are as follows: The spokes, composed of tubular iron or other metal, or rods, if the same should be desired, though I prefer tubular metal, should be cut of the right length and then bifurcated at the ends. In the case of the use of T-iron, as shown in Fig. 1, they will be so bifurcated at their outer ends as to straddle the flange of the T-iron and permit of being bent in opposite directions to the flange, as shown in Fig. 1. These ends are now bifurcated, as shown in Fig. 3, so as to straddle the flange or ridge F, and are then firmly secured to the sleeve which forms the hub by the plates H, shrunk or secured thereon by pins, as may be desired. This forms a complete and perfect wheel, though, as shown in the modification, channel or T iron may be similarly employed. This wheel so formed, having the sleeve G, is now placed upon the sleeve upon the axle J. Here it is held in position by means of the nuts O and the cap, as shown in Fig. 3. Now, when it is desired to oil the axle J, the box K$^5$ is opened and the oil-receptacle K is filled. The box is then closed, thus making a tight compartment in which a permanent supply of oil is retained. This chamber K, as shown in the drawings, opens against the axle J, so that a certain amount of oil is constantly supplied to the axle. This oil works its way down to the hub along the axle, keeping the wheel well lubricated. As it works out, it passes into the chamber in the end of the washer M. Here it is collected, and when the supply of oil is exhausted and the receptacle $K^2$ is again filled the refuse vitiated oil in the chamber M should be removed by removing the cap and washer.

What I claim, and desire to secure by Letters Patent of the United States, is as follows:

1. A vehicle-wheel consisting of an outer circle of T-iron, a series of spokes bifurcated at their outer ends so as to straddle the flange of the iron and secured thereto and bifurcated at their inner ends, and a sleeve with a ridge which the inner bifurcated ends straddle, and plates which secure the sleeve and bifurcated ends together.

2. A vehicle-wheel consisting of an outer circle of iron spokes bifurcated at their outer ends, being bent in opposite directions and secured to said iron.

3. The combination of an outer circle of T-iron, a series of tubular spokes bifurcated at their outer ends, said ends being bent in opposite directions and secured to said T-iron, as shown, and a center sleeve, and plates whereby the spokes are secured to form the hub.

4. The combination of a vehicle-wheel with an axle having at one end an oil-supplying chamber, a box which contains the same, and hinged portions $K^7$ and $K^6$, slotted to receive the pins $K^{10}$, as and for the purpose set forth, and at the other end a waste-oil-receiving receptacle, both of said receptacles opening against the axle, one at each side of hub, so that the oil is constantly supplied and the waste oil is constantly carried off.

CHARLES A. READE.

Witnesses:
CORA L. CADWALLADER,
E. F. BURTON.